E. L. DELANY.
VALVE MECHANISM.
APPLICATION FILED JULY 9, 1914.

1,194,364.

Patented Aug. 15, 1916.

Witnesses:
Marion I. Balfour

E. L. Delany, Inventor
By his Attorney

UNITED STATES PATENT OFFICE.

EDWARD L. DELANY, OF NEW YORK, N. Y.

VALVE MECHANISM.

1,194,364. Specification of Letters Patent. Patented Aug. 15, 1916.

Application filed July 9, 1914. Serial No. 850,004.

*To all whom it may concern:*

Be it known that I, EDWARD L. DELANY, residing at and whose post-office address is 832 Kent avenue, of the city of New York, in the county of Kings and State of New York, have invented certain new and useful Improvements in Valve Mechanism; and I do hereby declare the following to be a full, clear, and exact description of the invention, such as will enable others skilled in the art to which it appertains to make and use the same.

My present invention contemplates certain improvements in valves for flush tanks and relates to that class provided with means for holding the valve open while the water is passing through the spud, such means being rendered effective by the flow of the water and designed to release the valve and allow it to seat when the flow of water is discontinued.

Figure 1:
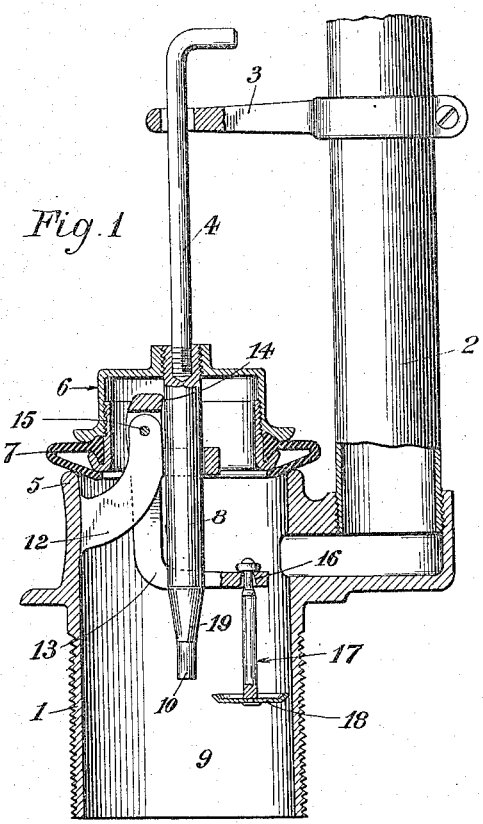
Figure 2:
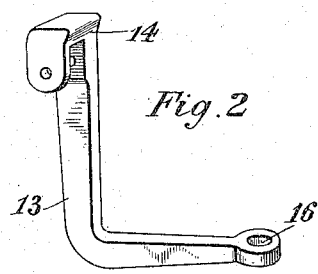
Figure 3:
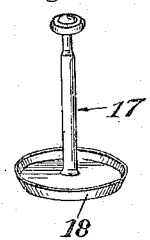

In the accompanying drawing my invention is shown in Fig. 1 in vertical longitudinal section. Figs. 2 and 3 are details of the parts removed.

The casing 1 is of the ordinary character adapted for flush tanks and is shown formed with an overflow tube 2, the latter having a lateral arm 3 formed with an aperture at its outer end to constitute a guide for the operating rod 4 by which the valve is unseated, the arm acting as a stop for the valve.

The casing is shown provided with a valve seat 5 adapted to receive the valve 6. This valve is shown provided with a washer 7 which forms no part of the present invention, being the subject matter of a copending application for patent filed by me April 8th, 1914, Serial No. 830,422.

I have shown the valve provided with a central depending valve stem 8 extending downward into the spud 9. This stem is a solid piece of metal formed with a tapered extremity 10. 12 designates a bracket constituting a guide and a latch or stop for the stem. It is rigidly attached to, or forms part of, the valve casing and is provided at its free end with an aperture which is of substantially the diameter of the main body portion of the stem 8, that is, it is sufficiently large to permit the stem to move freely through it.

Fulcrumed upon the bracket 12 is a bell crank lever 13 whose upright arm is formed with a bearing surface 14 above the fulcrum 15. When the valve is seated this bearing surface lies closely adjacent the body portion of the stem 8. The lateral arm of the lever 13 extends transversely of the spud 9 and has an aperture 16, formed near its free end, to receive a freely hanging member 17 of substantially inverted T shape, its lateral portion 18 being concaved or dished. The member 17 hangs loosely in the slot formed in the lateral arm of the lever.

In operation upon lifting the valve from its seat by the rod 4, the stem 8, moving with the valve, until the latter contacts with arm 3, is raised sufficiently far to bring its tapered extremity 10 within the guide 12, or at least to bring the abrupt surface 19 of this tapered portion just above the guide. As the water passes downward through the spud the dished portion 18 of the member 17 offers sufficient resistance to the flow of the water to cause the bell crank to swing and bring the contact surface 14 to bear against the valve stem 8 thereby exerting a lateral force upon the stem which causes the tapered extremity to be held against the walls of the guide member and thus provide a catch or stop to prevent the stem from lowering and the valve from seating until the water has entirely passed out of the tank at which time the gravitating lever 13 will swing to release the stem 8 and allow the valve to seat.

I claim as my invention:—

In a valve mechanism for flush tanks, the combination with a valve having a central depending stem formed with a tapered extremity, and a bracket rigidly mounted in the valve casing and formed with an aperture through which said stem projects, of a gravitating lever fulcrumed on said bracket and having an engaging surface adapted, when said valve is raised until the tapered extremity of said stem is within or above said bracket, to bear against said stem and hold the tapered extremity thereof in frictional engagement with said bracket to hold the valve elevated until the flow of water ceases.

In testimony whereof, I have signed this specification in the presence of two subscribing witnesses.

EDW. L. DELANY.

Witnesses:
GRAFTON L. McGILL,
MARION I. BALFOUR.

Copies of this patent may be obtained for five cents each, by addressing the "Commissioner of Patents, Washington, D. C."